United States Patent [19]

Balamane et al.

[11] Patent Number: 5,759,428
[45] Date of Patent: Jun. 2, 1998

[54] METHOD OF LASER CUTTING A METAL LINE ON AN MR HEAD

[75] Inventors: Hamid Balamane, Palo Alto; Chie Ching Poon, San Jose; Neil Leslie Robertson, Palo Alto; Andrew Ching Tam, Saratoga, all of Calif.

[73] Assignee: International Business Machines Corporation, Armonk, N.Y.

[21] Appl. No.: 616,395

[22] Filed: Mar. 15, 1996

[51] Int. Cl.$^6$ .................................................. B23K 26/08
[52] U.S. Cl. ........................ 219/121.66; 219/121.69; 219/121.72; 219/121.85; 29/603.07
[58] Field of Search .................. 219/121.61, 121.62, 219/121.65, 121.66, 121.67, 121.68, 121.69, 121.72, 121.8, 121.83, 121.73, 121.76, 121.85; 29/847, 603.01, 603.07, 603.16, 603.18; 360/113

[56] References Cited

U.S. PATENT DOCUMENTS

| | | | |
|---|---|---|---|
| 3,758,745 | 9/1973 | Wilker et al. | 219/121.62 |
| 4,258,078 | 3/1981 | Celler et al. | 219/121.66 |
| 4,463,073 | 7/1984 | Miyauchi et al. | 427/555 |
| 4,476,375 | 10/1984 | Ogawa | 219/121.72 |
| 4,734,550 | 3/1988 | Imamura et al. | 219/121.61 |
| 4,798,931 | 1/1989 | Hess, III | 219/121.64 |
| 4,859,826 | 8/1989 | Hess, III | 219/121.63 |
| 4,877,175 | 10/1989 | Jones et al. | 219/121.65 |
| 4,905,310 | 2/1990 | Ulrich | 219/121.64 |
| 5,164,565 | 11/1992 | Addiego et al. | 219/121.68 |
| 5,185,291 | 2/1993 | Fischer et al. | 437/173 |
| 5,290,986 | 3/1994 | Colon et al. | 219/770 |
| 5,464,186 | 11/1995 | Bajorek et al. | 360/113 |
| 5,539,372 | 7/1996 | Ishiyama et al. | 338/32 R |
| 5,602,079 | 2/1997 | Takenaka et al. | 219/121.69 |

*Primary Examiner*—Gregory L. Mills
*Attorney, Agent, or Firm*—Baker Maxham, Jester & Meador

[57] ABSTRACT

A thin film conductive line is formed between MR pads on an MR head for protecting an MR sensor from electrostatic discharge (ESD) during assembly steps between row level fabrication of the head and prior to merge of a head stack assembly with a disk stack assembly. The conductive line may have a reduced thickness delete pad. A laser beam having a fluence sufficient to sever the conductive line at the delete pad but insufficient to damage or cause debris from structure underlying or surrounding the conductive line is used to sever the conductive line. The method traverses minimum energy, short laser pulses at a high pulse rate across the width of the conductive line so that each laser pulse melts conductive material across the line, the melted material withdrawing from the melted area and being heaped on top of adjacent portions of the delete pad by surface tension and the melted material cooling to room temperature before the next pulse so that there is no cumulative heating and therefore no damage to or debris from the underlying structure. The conductive material of the line is incrementally plowed to each side of a severed path by successive overlapping laser pulses so that when the series of laser pulses has traversed the width of the delete pad the conductive line has been severed.

22 Claims, 15 Drawing Sheets

METHOD OF LASER CUTTING A METAL LINE ON AN MR HEAD

BACKGROUND OF THE INVENTION

1. Field of the Invention

The present invention relates to a method of laser cutting a metal line on a magneto-resistive (MR) head and more particularly to a method of laser cutting a metal line which shorts leads to an MR sensor in the MR head.

2. Description of the Related Art

MR sensors are commonly used as read elements in thin film magnetic heads for sensing recorded signals on a magnetic medium, such as a magnetic disk. A thin film magnetic head, which incorporates an MR sensor, is called an MR head. An MR sensor includes a thin stripe of conductive material, such as Permalloy (NiFe). When a magnetic medium, such as a magnetic disk, is rotated adjacent the stripe, magnetic fields from the medium cause the stripe to change its resistance. A sense current conducted through the MR stripe changes its magnitude proportionally to the change in resistance. The magnitude changes are then processed by channel electronics into playback signals representing information stored on the magnetic medium.

A typical MR stripe is 3 µm wide, 2 µm high and 200 Å thick. The length and thickness of the MR stripe are exposed at an exterior surface of the MR head while the height is buried in the head body. During construction and assembly of the MR head, the MR stripe must be protected from electrostatic discharge (ESD). A discharge of only a few volts can destroy or severely damage the MR stripe. Such a discharge can occur by contact with or close proximity to a person, plastic involved in the fabrication, or components of a magnetic medium drive.

The MR sensor is positioned between a pair of thin film gap layers which are in turn sandwiched between a pair of thin film shield layers. A pair of thin film leads, which are employed for transmitting the sense current through the MR sensor, also lie between the gap layers. The leads terminate at a pair of pads which are exposed for connection to drive electronics. A convenient way of protecting the MR sensor from ESD is to interconnect the pads with a thin film conductive line on the exterior surface of the MR head. This shorts the MR circuit, preventing discharge across it. The best time during assembly of a magnetic disk drive to form the conductive line between the pads is at the row level which will be explained hereinafter.

Magnetic heads are typically formed in rows and columns on a wafer of titanium carbide (TiC). After formation of the magnetic heads, the wafer is cut into rows. At the row level the thin film conductive lines are formed between the pads for shorting the MR sensors. Each row is then cut into individual heads with a portion of the TiC wafer serving as a slider for supporting a magnetic head. Each slider with a head mounted thereon is mounted on a head gimbal assembly (HGA), which is in turn mounted on a suspension, which is in turn mounted on an actuator arm. A plurality of actuator arms may be mounted in an actuator assembly to form a head stack assembly. From the time of forming the conductive lines up to the time of forming the head stack assembly the MR sensors have been protected from ESD. The next step is to merge the head stack assembly with a disk stack assembly to form a completed disk drives which step is simply referred to in the art as "merge". The most practical time to sever the conductive line of each MR head so that the MR sensor becomes operational is just before merge.

Heretofore, the conductive lines have been severed by chemical etching or physical sputtering. Both of these methods are cumbersome after the head stack assembly has been formed and both methods impact the entire head. When sputtering is employed it is very difficult to avoid damaging the head and to prevent debris from forming. Debris from the head can be especially troublesome because of the potential of contaminating the disk drive. Consequently there is a strong felt need to provide a simpler method of severing the conductive line in the MR sensor circuit without generating debris.

SUMMARY OF THE INVENTION

The present invention provides a non-invasive method of severing a conductive line which protects an MR sensor from ESD. After severing the conductive line the MR sensor is rendered operational for use in a magnetic disk drive. The method employs a laser beam which has a fluence sufficient to sever the conductive line but insufficient to damage or to generate debris from an underlying head surface support for the line.

More specifically the method traverses a sequence of short minimum-energy laser pulses at a high pulse rate across the width of the conductive line so that each laser pulse melts conductive material across the line, the melted material withdrawing from the melted area and being heaped on top of opposite adjacent lengths of the conductive line by surface tension and the melted material cooling to room temperature before the next pulse. As a result, there is no cumulative heating and therefore no damage to or debris from the underlying head surface structure. With this method the conductive material is incrementally plowed to each side of a cleared path by successive overlapping laser pulses so that when the train of laser pulses has traversed the width of the conductive line the line has been severed.

The conductive line is formed by thin film deposition and is typically 60 µm wide and about 2 µm thick. We have found that by providing a "delete pad" portion along the length of the conductive line with reduced thickness that the aforementioned parameters of the invention are enhanced. In one example we provided a NiFe conductive line with a delete pad 60 µm wide by 60 µm long and only 3,700 Å thick. With 95% overlapping laser pulses, each having energy of 8 µJ and a pulse width of 12 ns, and with a pulse rate of 12.5 kHz, the delete pad was cleanly severed without damage to or debris from an Alumina support base.

A unique laser apparatus is employed for severing the conductive line. A Nd:YLF or Nd:YAG acousto-optically Q-switched pulse laser may provide the short width high repetition rate laser pulses. These pulses are reflected from a Galvo mirror which rotates to cause the pulses to traverse across the conductive line. Provision is made for the pulses to strike only the width of the conductive line and not any supporting material beyond the width of the line. This may be accomplished by a slitted plate between the Galvo mirror and the conductive line which masks all areas except the width of the conductive line. Alternatively, a shutter may be employed between the laser and the Galvo mirror, which allows the laser pulses to pass only when the Galvo mirror is traversing the width of the line. The laser apparatus may also include one or more additional lasers with a visible light spectrum so that an operator can align the apparatus with the conductive line and know when the laser pulses are being passed to the conductive line.

Accordingly, the invention may include providing a conductive line with a predetermined delete pad, directing a unique combination of laser pulses onto the delete pad to sever the pad across its width without damaging or creating debris from underlying structure and implementing the unique combination of laser pulses with a unique laser apparatus.

An object of the present invention is to employ laser energy to sever a thin film conductive line without damaging or causing debris from an underlying structure.

Another object is to provide progressive incremental severing of a thin film conductive line by melting a spot of material sufficient to cause withdrawal of the material to each side of the spot by surface tension and then allowing cooling of the material before a next overlapping spot is melted, and so on, until the thin film conductive line is severed across its width.

A further object is to provide a unique laser apparatus which will trace a series of laser pulses across one or more widths of a thin film conductive line without damaging or causing debris from underlying structure.

Still another object is to provide a thin film structure with a thin film conductive line, the thin film conductive line having a delete pad which has been severed by traversal of a sequence of unique laser pulses across the delete pad without impacting an underlying structure and without impinging on surrounding structure so that the underlying and surrounding structures are not damaged and do not produce debris.

Still a further object is to sever thin film conductive lines with no invasion of underlying and surrounding structures.

Other objects and attendant of advantages of the invention will become apparent upon reading the following description taken together with the accompanying drawings.

DESCRIPTION OF THE PREFERRED EMBODIMENTS

Figure 1:
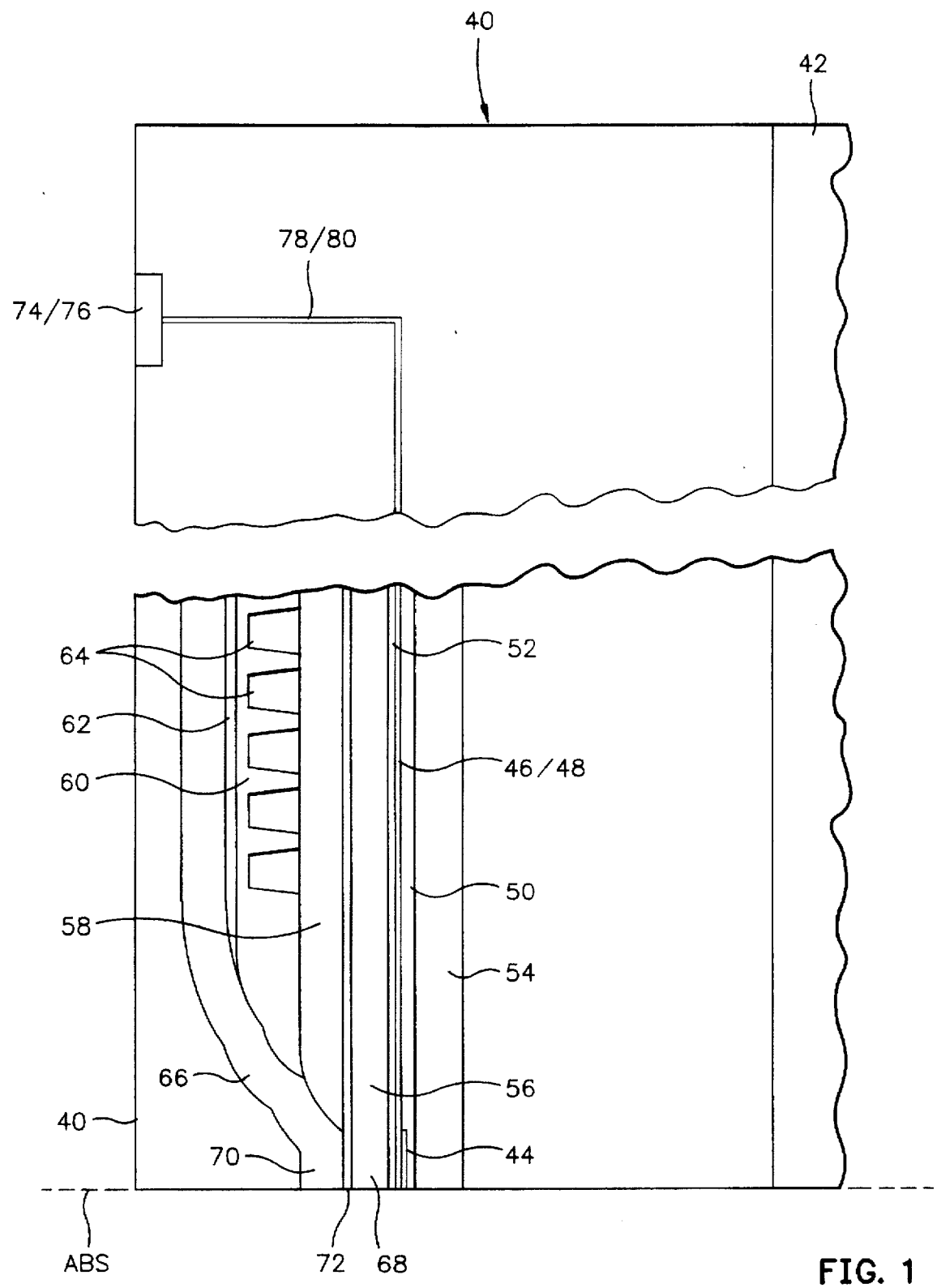
FIG. 1 is a cross-sectional view of a merged MR head mounted on a slider.

Referring now to the drawings wherein like reference numerals designate like or similar parts throughout the several views there is illustrated in FIG. 1 a magnetic head 40 which is mounted on a slider 42. The magnetic head has a read head portion and a write head portion. The read head portion includes a magnetoresistive (MR) sensor 44 and accompanying leads 46/48 which are sandwiched between first and second gap layers 50 and 52 which are, in turn, sandwiched between first and second shield layers 54 and 56. The write head portion of the magnetic head includes an insulation stack of layers 58, 60 and 62 with a coil layer 64 embedded therein sandwiched between first and second pole pieces 56 and 66. In this embodiment the second shield layer of the read head and the first pole piece of the write head are the same layer 56. This type of head is referred to as a merged MR head. When the second shield layer and the first pole piece are separate layers the magnetic head is referred to as a piggyback MR head. Either type of head is applicable to the present invention. The first and second pole pieces 56 and 66 terminate in first and second pole pieces 68 and 70 which are separated by a gap layer 72. During recording flux induced in the first and second pole pieces 56 and 66 by the coil layer 64 is conducted to the pole tips, where the flux fringes across the gap layer 72 to magnetically record signals on a rotating magnetic disk. During playback changing magnetic fields on the rotating disk cause a proportional resistance change in the MR sensor 44. A sense current, which is conducted through the MR sensor 44 via the first and second leads 46 and 48, varies proportionately to the change in resistance of the MR sensor 44, thereby allowing detection of the playback signal.

The first and second leads 46/48 from the MR sensor are connected to exterior pads 74/76 by vias 78/80. There are two leads, two vias and two pads which will be shown in plan views in subsequent figures. The aforementioned sense current is inducted to the MR sensor 44 by processing circuitry which is connected to the pads 74/76. The MR sensor 44 includes an MR stripe which is typically a very small Permalloy (NiFe) component. Typical dimensions of the MR stripe are 3 µm wide, 2 µm high and 200 Å thick. During construction and assembly of a magnetic disk drive the MR stripe is very vulnerable to electrostatic discharge (ESD) across the pads 74/76. This can be caused by contact with a person or other components involved in the assembly of the disk drive. During the early stages of construction it is not practical to protect the MR sensor 44 from ESD since the investment is still minimal. However, it is important to protect the MR sensor 44 from ESD as early as practical. This can be accomplished by shorting the MR circuit with a conductive line across the pads 74/76 that can be easily removed at a subsequent stage in the manufacturing process. The following discussion addresses the manufacturing of the magnetic disk drive, commencing with fabrication of the magnetic heads and sliders, and particularly emphasizes fabricating a conductive line across the MR pads and severing this conductive line during the manufacturing process to render the MR sensor operational.

Figure 2:
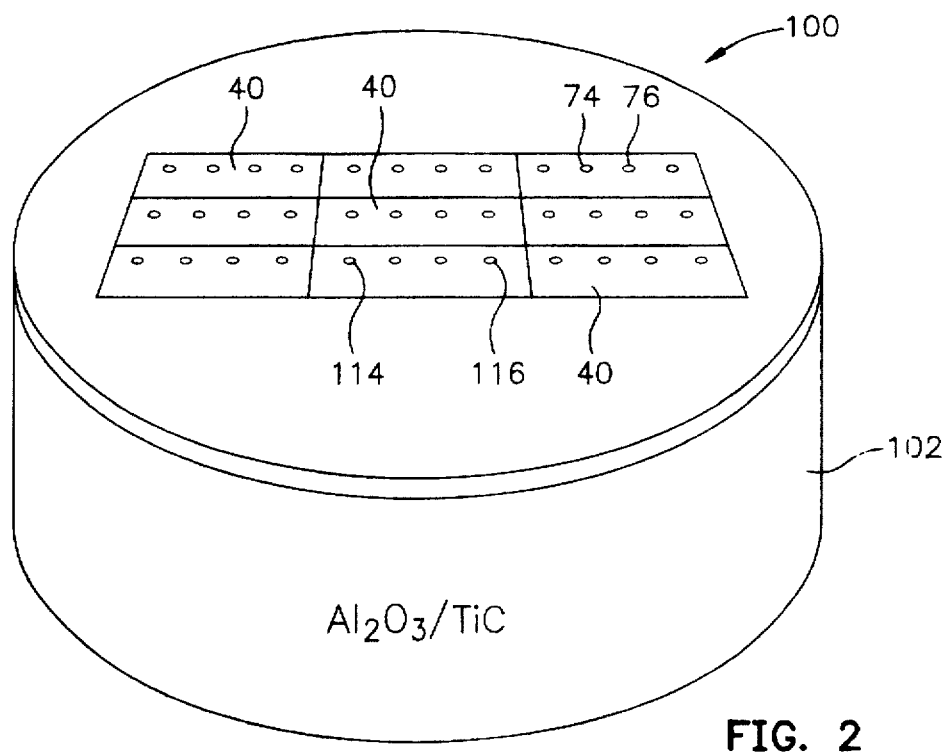
FIG. 2 is an isometric view of rows and columns of magnetic heads formed on a wafer.
Figure 3:
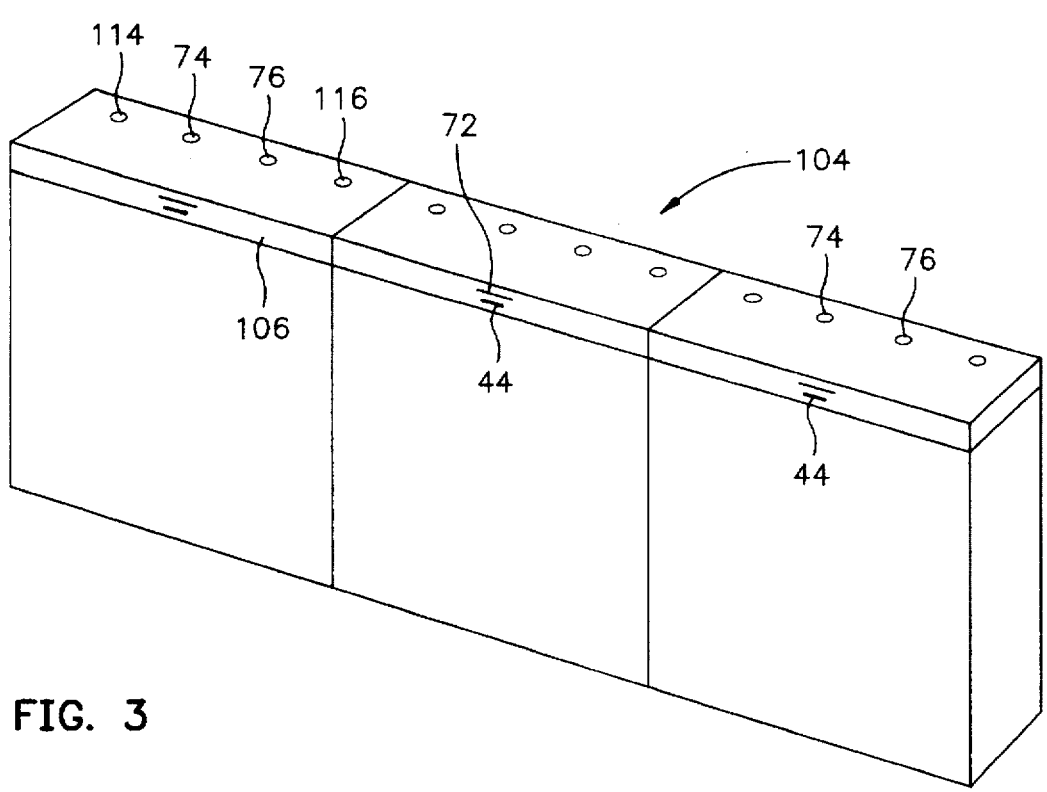
FIG. 3 is an isometric view of a row of magnetic heads cut from the wafer shown in FIG. 1.

In FIG. 2 a plurality of magnetic heads 40 are shown fabricated in rows and columns at the wafer level 100 on a wafer 102 which will provide a slider for each head after cutting. A typical slider material is alumina/titanium carbide ($Al_2O_3$/TiC). The magnetic heads are fabricated by forming a plurality of thin film layers which are shown in FIG. 1. The thin film layers are formed by plating, sputtering and various masking techniques which are well known in the art. After formation of the required thin film layers the rows and columns of magnetic heads are diced into rows, one row of magnetic heads being illustrated at 104 in FIG. 3. This stage of the process is referred to as the row level. At the row level the row 104 of magnetic heads may be lapped (not shown) across the pole tips for forming desired zero throat heights for the first and second pole tips 68 and 70 of each head as seen in FIG. 1.

Figure 4:
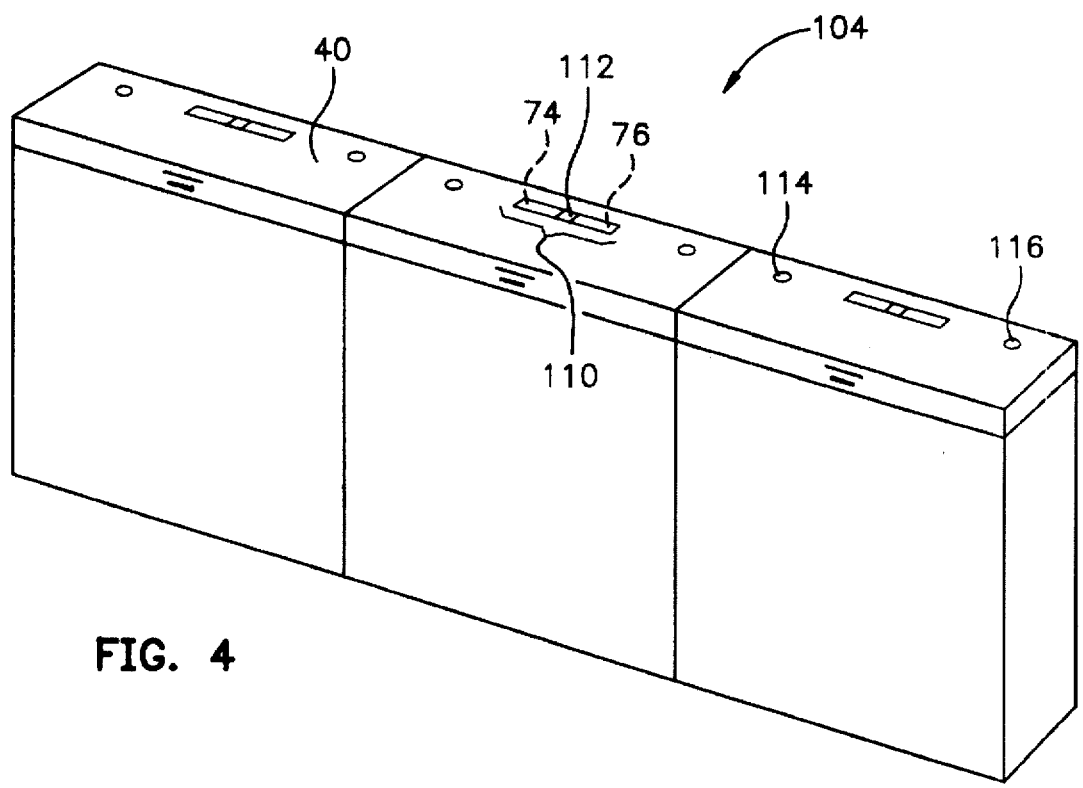
FIG. 4 is the same as FIG. 3 except thin film conductive lines have been formed between pairs of pads to MR sensors.
Figure 5:
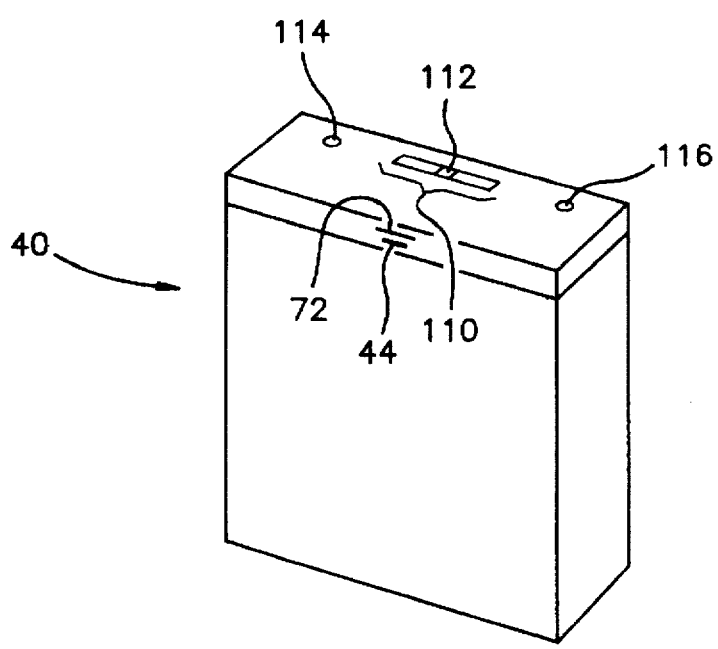
FIG. 5 is an isometric view of an MR head after being cut from the row of FIG. 4.

In FIG. 4 a conductive line 110 is connected across each of the MR pads 74 and 76 of each magnetic head 40. Preferably, the conductive line 110 is a thin film deposition of Permalloy (NiFe). The conductive line 110 is typically 300 µm long between the pads 74 and 76, 60 µm wide and 5 µm thick. We have found that providing the conductive line 110 with a reduced thickness length portion, which is referred to hereinafter as a delete pad 112, that the purposes of the present invention are more efficiently achieved. We have found that the best time to form the conductive lines 110 is at the row level, however, it should be understood that these lines could be formed at the wafer level shown in FIG. 2. The row of magnetic heads 104 is then diced into individual magnetic heads, one of these magnetic heads 40 being illustrated in FIG. 5. It should be understood that in actual practice a significantly greater number of rows and columns than that illustrated in FIG. 2 would be constructed at the wafer level. The two outside pads 114 and 116 are connected to the coil layer 64, shown in FIG. 1, for inducing write signals into the write head portion of the magnetic head. The components of the write head portion are large and do not need protection from ESD.

Figure 6:
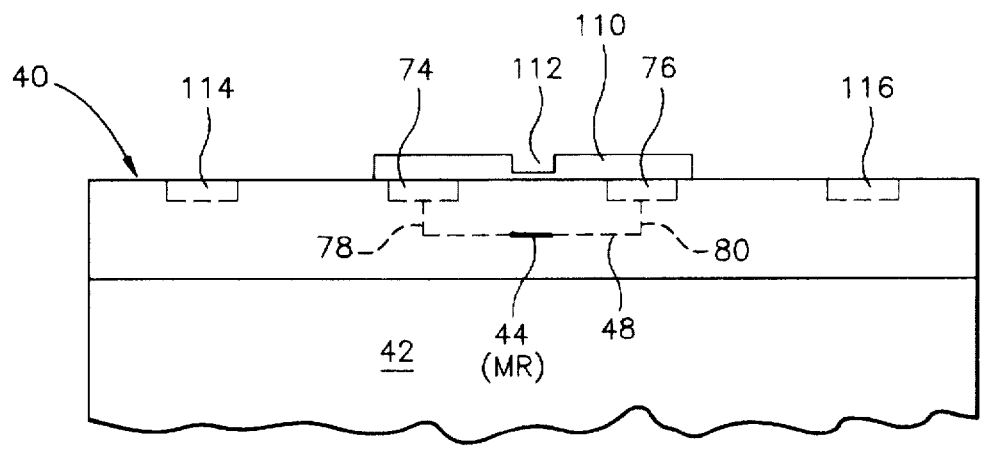
FIG. 6 is an enlarged schematic plan illustration of the slider mounted merged MR head with the pair of pads to the MR sensor being interconnected by the conductive line at a delete pad portion, the majority of the slider being broken away.
Figure 7:
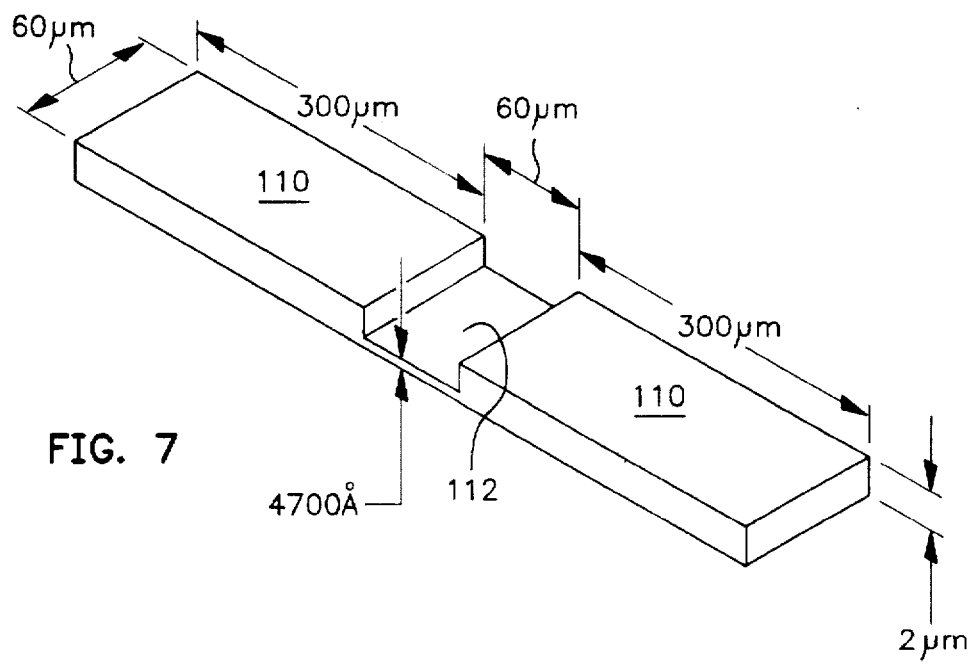
FIG. 7 is an enlarged isometric illustration of just the conductive line.

FIG. 6 shows a schematic illustration of the magnetic head 40 and a portion of the slider 42. The conductive line 110 with its delete pad 112 can be seen connecting the MR pads 74 and 76, the pads 74 and 76 being connected to the MR sensor 44 by the vias 78 and 80 and first and second leads 46 and 48. FIG. 7 shows an isometric illustration of the conductive line 110 per se with its delete pad 112. In one of our experiments the conductive line was 300 µm long, 60 µm wide and 2 µm thick and the delete pad 112 was 60 µm long, 60 µm wide and 3700 Å thick. The experiment that employed this conductive line will be explained in more detail hereinafter.

Figure 8:
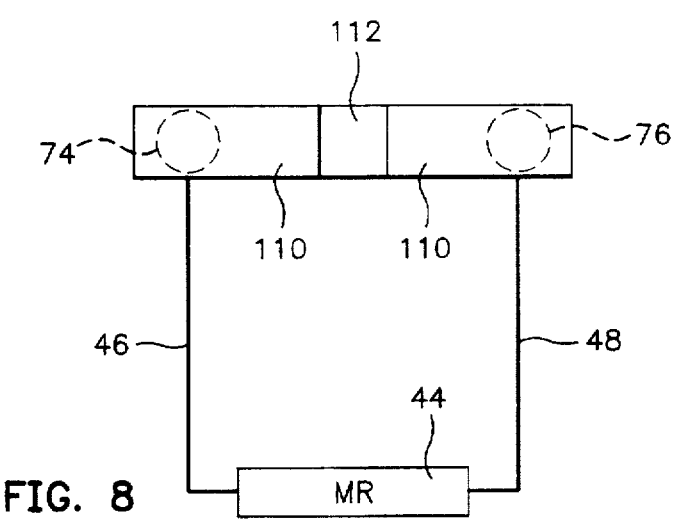
FIG. 8 is a schematic electrical illustration showing the conductive line interconnecting the pair of pads to the MR sensor.

FIG. 8 is an electrical diagram of the conductive line 110 interconnecting the MR pads 74 and 76 so that the MR sensor 44 is provided with a closed circuit for protection from ESD.

Figure 9:
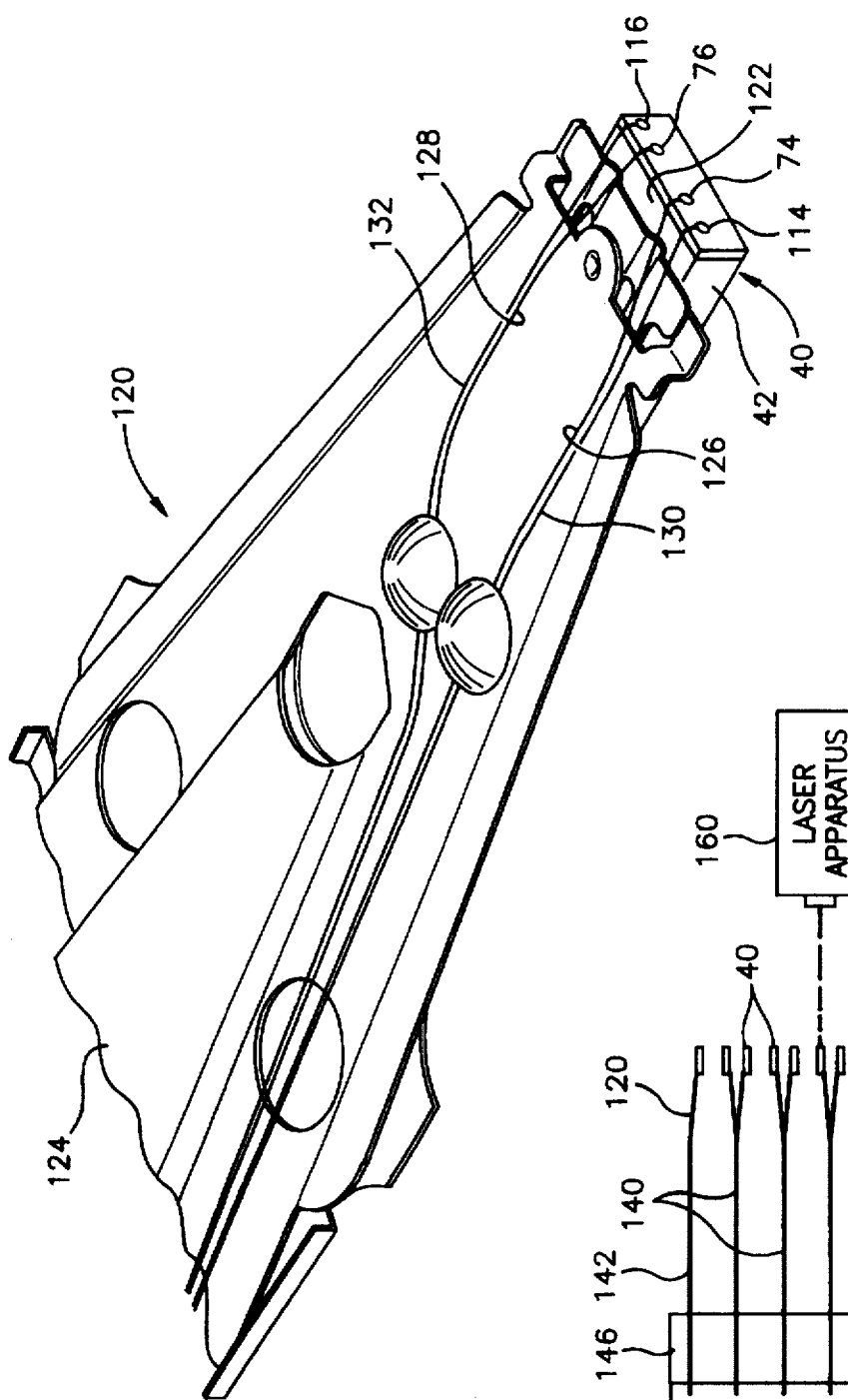
FIG. 9 is an isometric illustration of the merged MR head and slider mounted on a suspension of a magnetic disk drive.

In FIG. 9 the magnetic head 40 and the slider 42 are shown mounted on a suspension 120, the suspension including a flexure 122 which is connected at one end to a load beam 124. The slider 42 is typically manually bonded to the flexure 122 and the flexure 122 is manually connected by spot-welding to the load beam 124. It is during these manual steps that the MR sensor is particularly vulnerable to ESD and is protected by the conductive line 110. After mounting the magnetic head 40 on the suspension 120 leads 126 and 128 may be connected to the pads 74 and 76 for the MR sensor and leads 130 and 132 may be connected to the pads 114 and 116 for the write coil.

Figure 10:
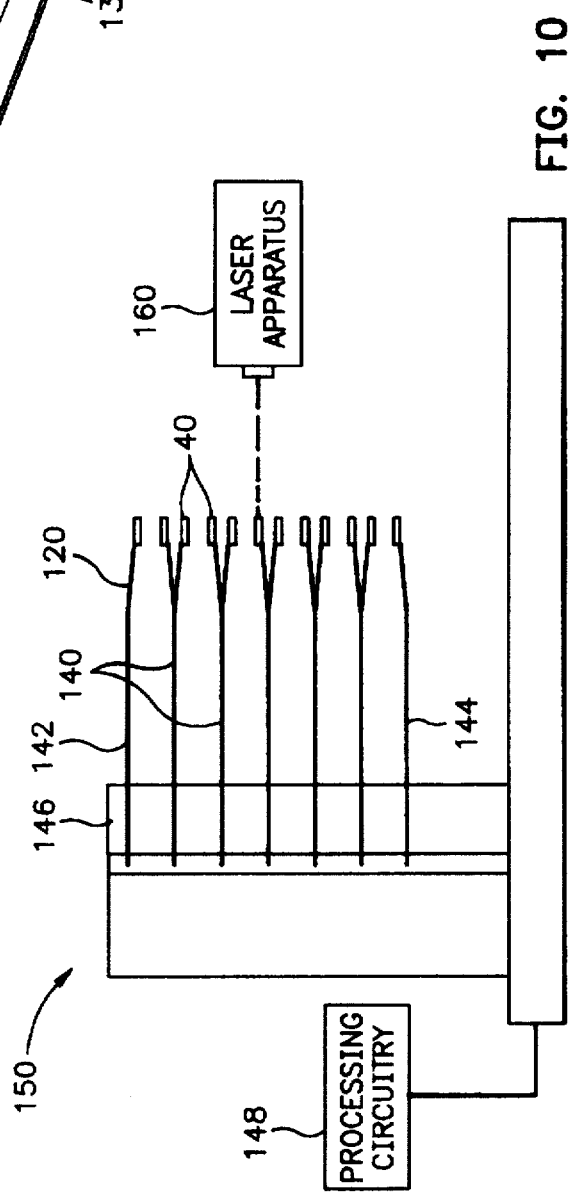
FIG. 10 is a vertical illustration of a plurality of suspensions carrying a plurality of merged MR heads and sliders, the suspension being mounted on an actuator assembly.

Further in the assembly a pair of load beams 124 may be mounted to each intermediate actuator arm between top and bottom actuator arms 142 and 144 as shown in FIG. 10. The intermediate actuator arms carry magnetic heads for reading the tops and bottoms of double-sided magnetic disks which will be described hereinafter. Each actuator arm 140, 142 and 144 are mounted on an actuator spindle 146 which is controlled for rotation by processing circuitry 148 to position the magnetic heads over circular tracks on the magnetic disks. This assembly is referred to as a head stack assembly 150 which will be subsequently merged with a disk stack assembly described hereinafter.

The best time to sever the conductive lines on the magnetic heads is after completion of the head stack assembly 150 as shown in FIG. 10. The conductive lines on the magnetic heads of the head stack assembly are severed by a unique laser apparatus 160 which is operated according to the present invention. Prior art severing of conductive lines has been accomplished by chemical etching or physical sputtering techniques. These techniques have been very difficult to employ at the head stack assembly level shown in FIG. 10. The present invention traverses a series of laser pulses across the width of the conductive line of each magnetic head which results in a severing of the line and rendering the magnetic head operational for use in a magnetic disk drive.

Figure 11A:
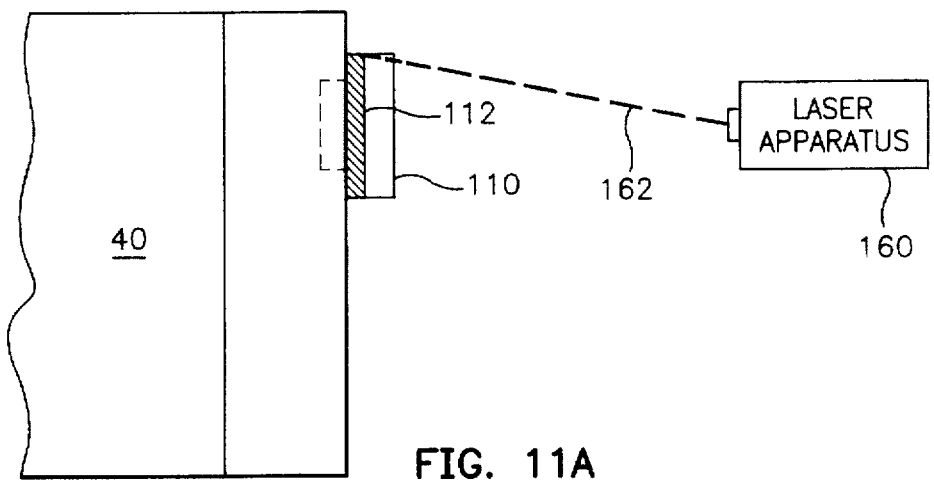
FIGS. 11A and 11B are vertical and plan views at the commencement of severing of the conductive line at a delete pad by a laser apparatus.
Figure 11B:
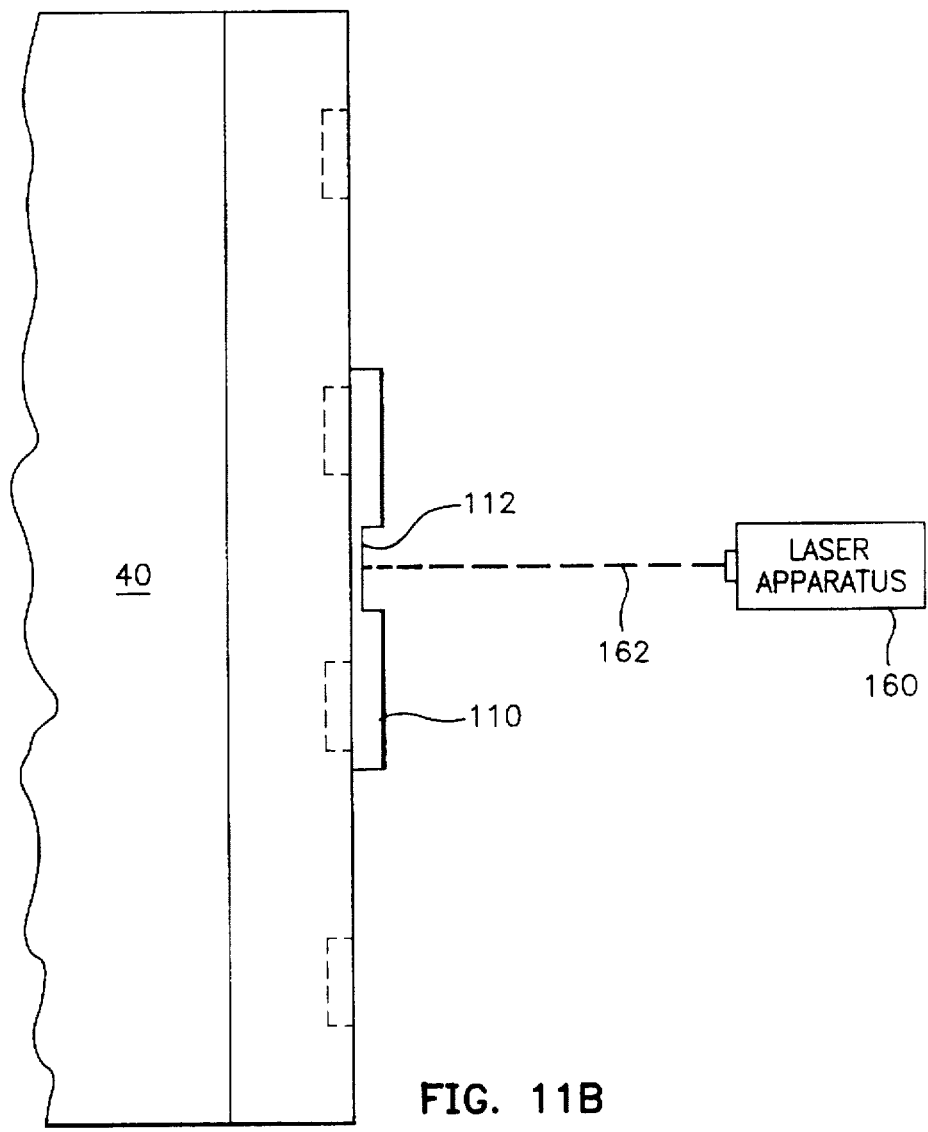
Figure 12A:
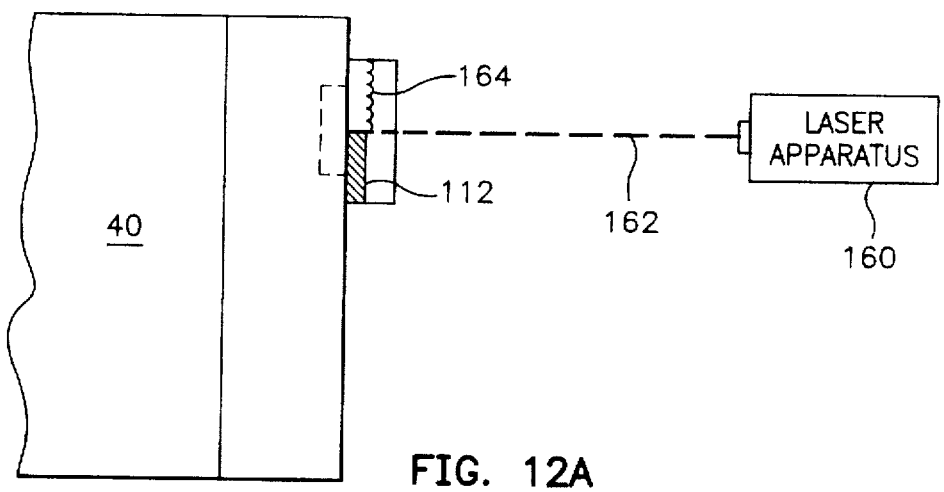
FIGS. 12A and 12B are the same as FIGS. 11A and 11B except the laser apparatus is half-way through the severing process.
Figure 12B:
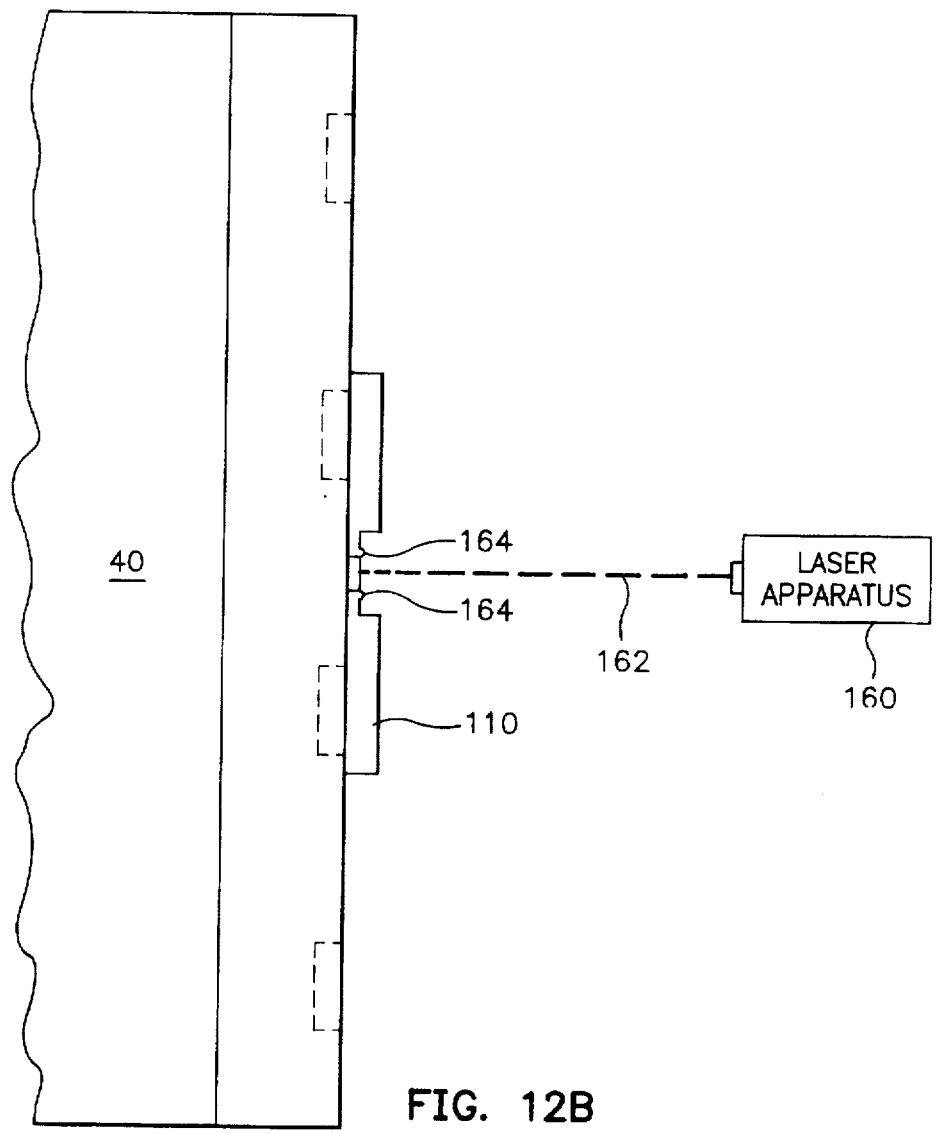
Figure 13A:
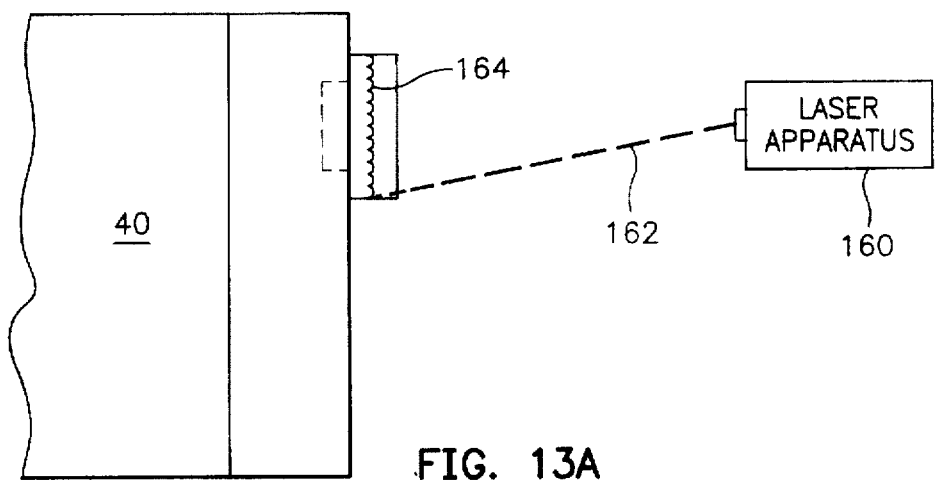
FIGS. 13A and 13B are the same as FIGS. 12A and 12B except the conductive line has been completely severed across its delete pad by the laser apparatus.
Figure 13B:
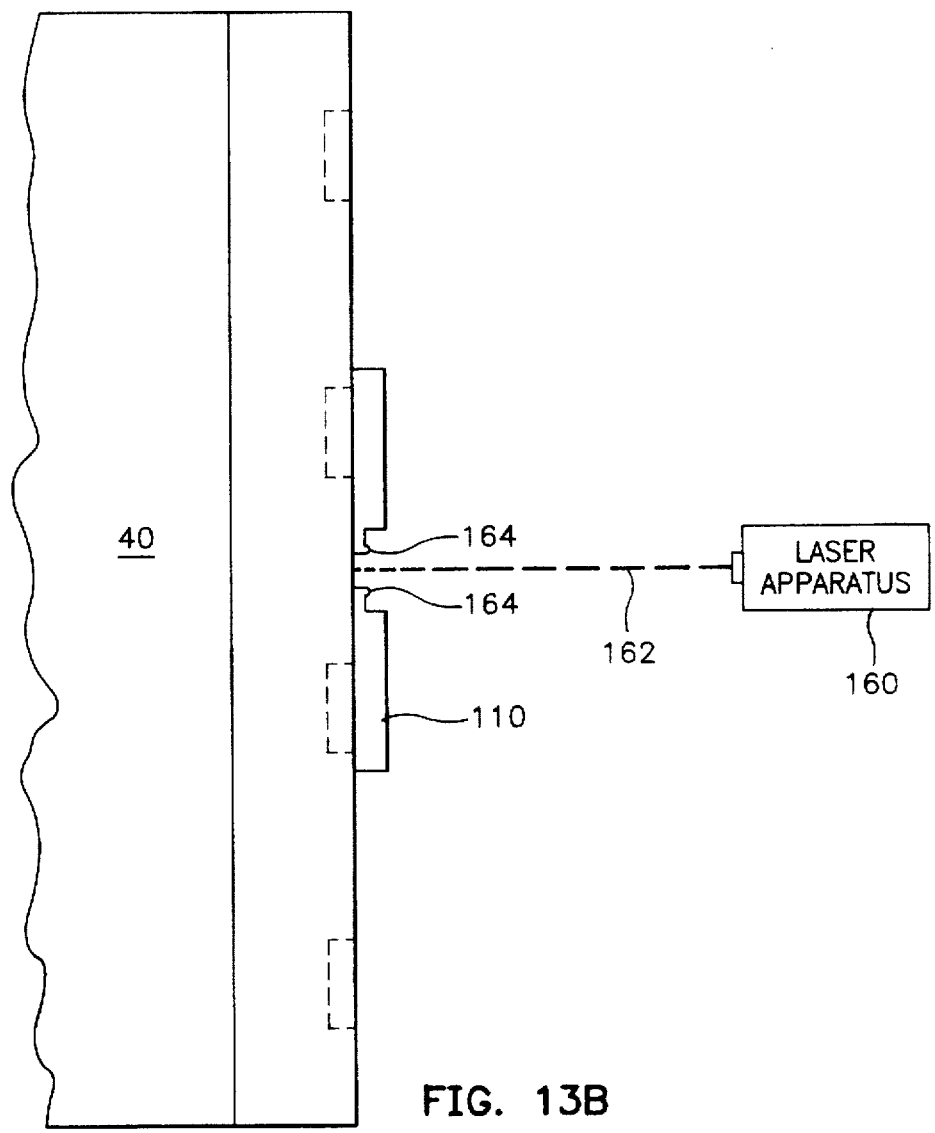
Figure 14:
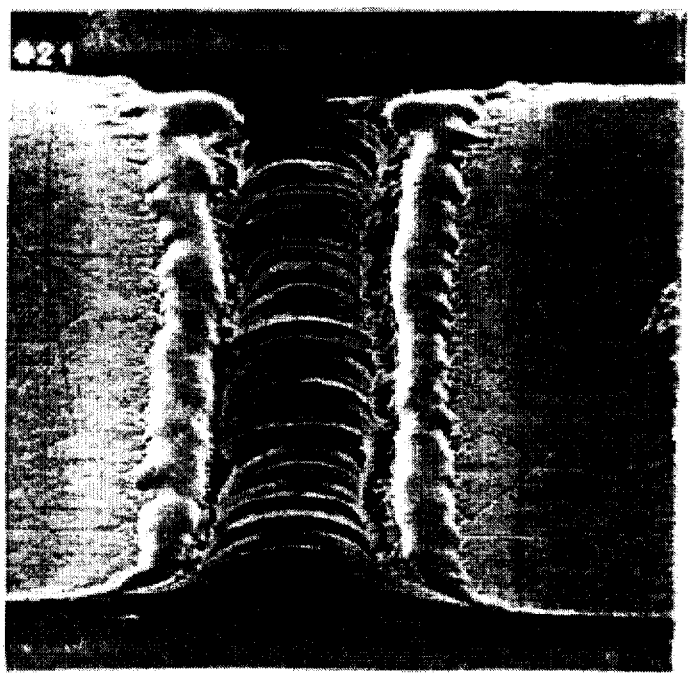
FIG. 14 is a SEM photograph showing the severing of a conductive line at its delete pad by the laser apparatus.
Figure 15:
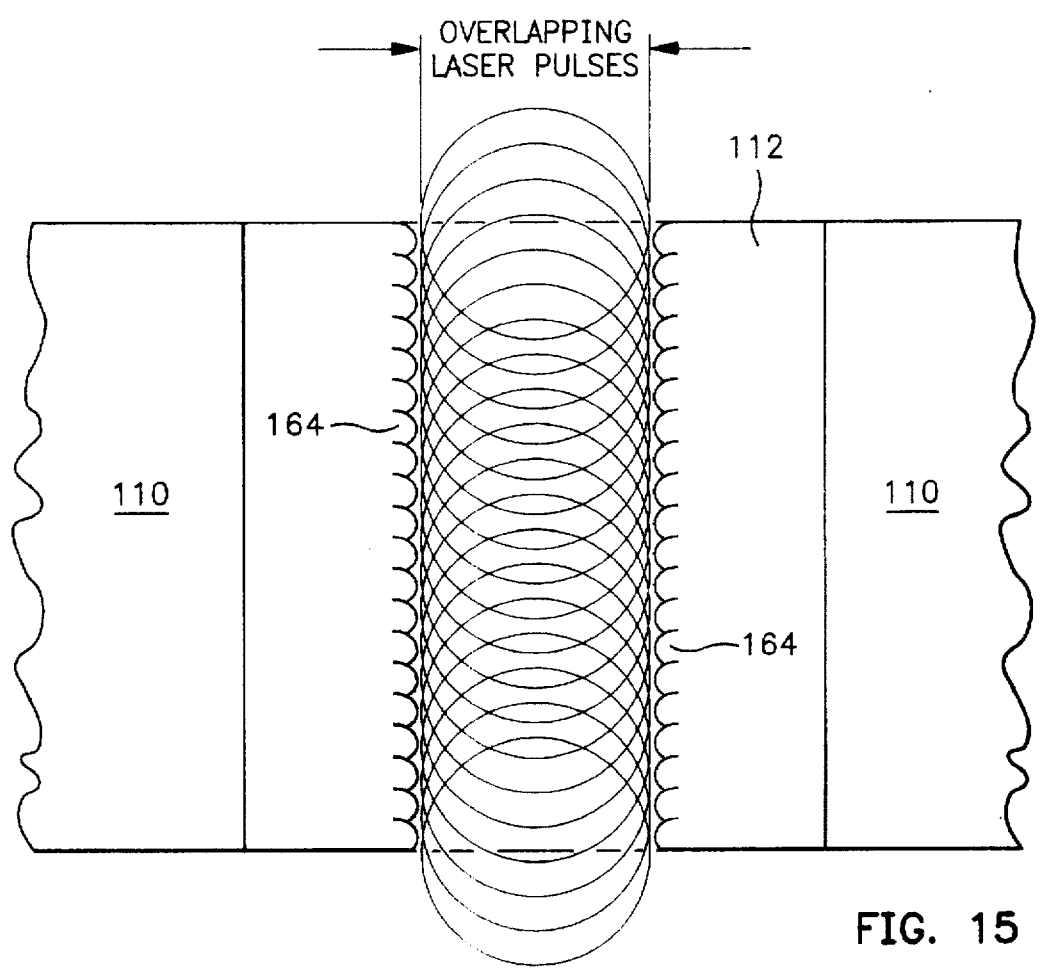
FIG. 15 is a schematic plan illustration of a series of overlapping laser pulses having cut through a delete pad.

As shown in FIGS. 11A–14 the method of the present invention employs a laser beam 162 which has a fluence sufficient to sever the conductive line but insufficient to damage or cause debris from head material underlying and surrounding the conductive line. The head material is typically constructed from alumina ($Al_2O_3$). More specifically, the laser beam 162 is minimum energy short duration laser pulses of a high repetition rate which is traversed across the width of the delete pad 112 of each conductive line 110 so that each laser pulse melts conductive material across the line, the melted material withdrawing from the melted area and being heaped on top of opposite adjacent length portions of the conductive line at 164 by surface tension and the melted material cooling to room temperature before the next pulse so that there is no cumulative heating and therefore no damage to or debris from structure underlying or surrounding the conductive line. With this method the conductive material is incrementally plowed to each side of a cleared path by successive overlapping laser pulses so that when the train of laser pulses has traversed the width of the delete pad 112 the conductive line has been severed. FIGS. 11A and 11B show the laser beam 162 at commencement of the cutting process. FIGS. 12A and 12B show the laser beam intermediate the cutting process and FIGS. 13A and 13B show a completion of the cutting process by the laser beam 162. A SEM photograph showing the severing of a conductive line is shown in FIG. 14. The severing extends across a width of the line at 166 and the material plowed from the path of separation is shown at 164 on each side of the cut due to surface tension. In one test Permalloy (NiFe) was employed as the material for the conductive line and the conductive line had a delete pad which was 60 µm wide by 60 µm long and only 3700 Å thick. With 95% overlapping laser pulses having energy of 8 µJ, a pulse width of 12 ns and a pulse rate of 12.5 kHz the delete pad was cleanly severed without damage to or debris from an alumina supporting structure. FIG. 15 shows a schematic drawing of overlapping laser pulses which can overlap 95% or less provided the parameters of the invention are practiced. A Nd:YLF or Nd:YAG acousto-optically Q-switched pulse laser may be employed in the laser apparatus. Practical ranges are as follows: a delete pad 1,000 to 5,000 Å thick, laser energy per pulse from 5 µJ to 50 µJ, laser pulse rate from 1 kHz to 20 kHz, laser pulse width from 5 ns to 30 ns, cutting speed 0.5 mm/sec to 100 mm/sec, laser spot diameter on the delete pad from 5 µm to 50 µm and the number of laser passes for cutting in the range of 1 to 10. It should be understood, however, that the invention is not limited to these parameters. For instance, the laser energy per pulse may be in the range of 1 µJ to 1,000 µJ, the laser pulse rate may be in the range from 0.1 kHz to 500 kHz, the laser pulse width may be from 0.1 ns to 500 ns, and the thickness of the material cut may be in the range from 500 to 50,000 Å. In our example, the spot diameter was 20 µm and the incremental movement for consecutive spots was 1 µm resulting in a 95% overlap. A 20 µm spot actually melts a path approximately 8 µm wide. The traversal rate was 1 µm in 80 microseconds which is equivalent to 12.5 mm/sec.

Figure 17:
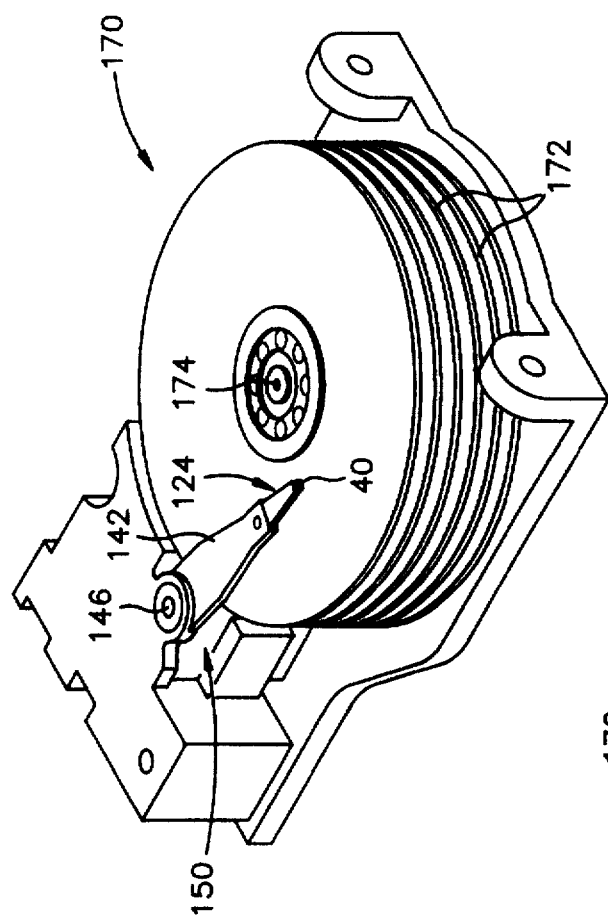
FIG. 17 is an isometric illustration of the magnetic disk drive shown in FIG. 16.
Figure 16:
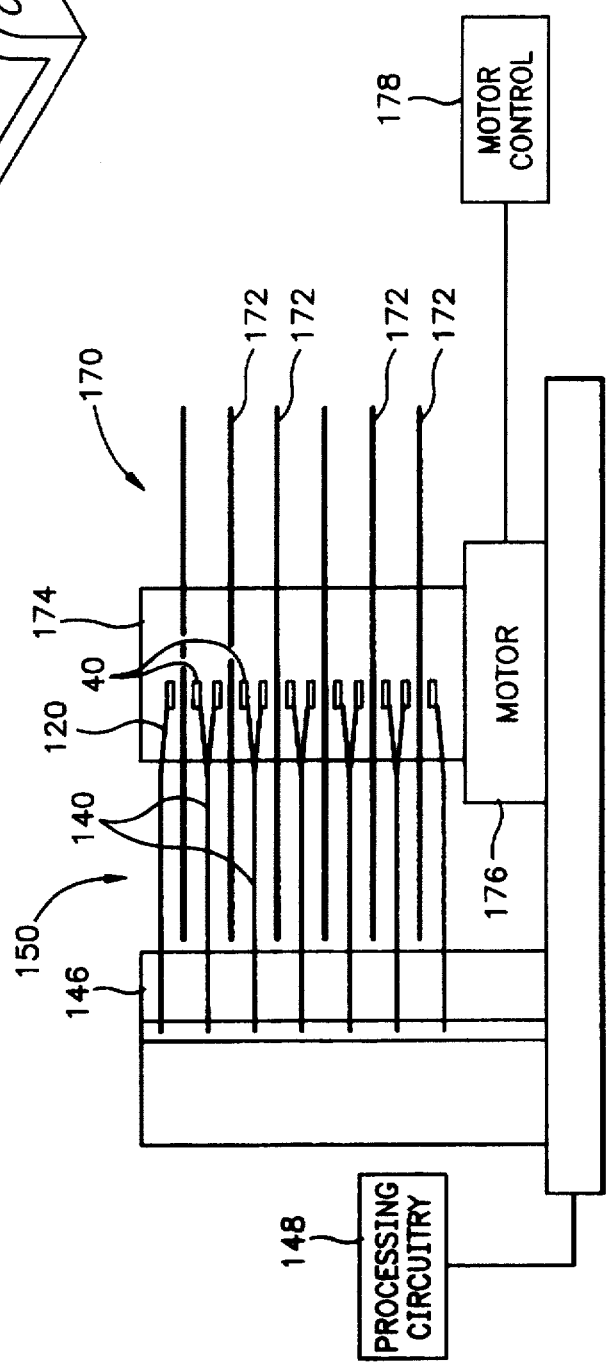
FIG. 16 is a schematic elevational view of a magnetic disk drive employing magnetic heads processed by the present invention.

After cutting the conductive lines on the magnetic heads the head stack assembly 150 is merged with a disk stack assembly 170 as shown in FIG. 16. The disk stack assembly 170 includes a plurality of double-sided magnetic disks 172 which are mounted on a motor spindle 174. The motor spindle 174 is rotated by a motor 176 which is controlled by motor control 178. Upon rotation of the magnetic disks 172 the sliders are supported a slight distance from the surfaces of the disks, in the order of 0.075 µm, by air cushions which are generated by the rotating disks. The actuator spindle 146 is then controlled by processing circuitry 156 to position the magnetic heads over predetermined circular information tracks on the magnetic disks for recording and playback purposes. An isometric illustration of the magnetic disk drive is illustrated in FIG. 17.

Figure 18:
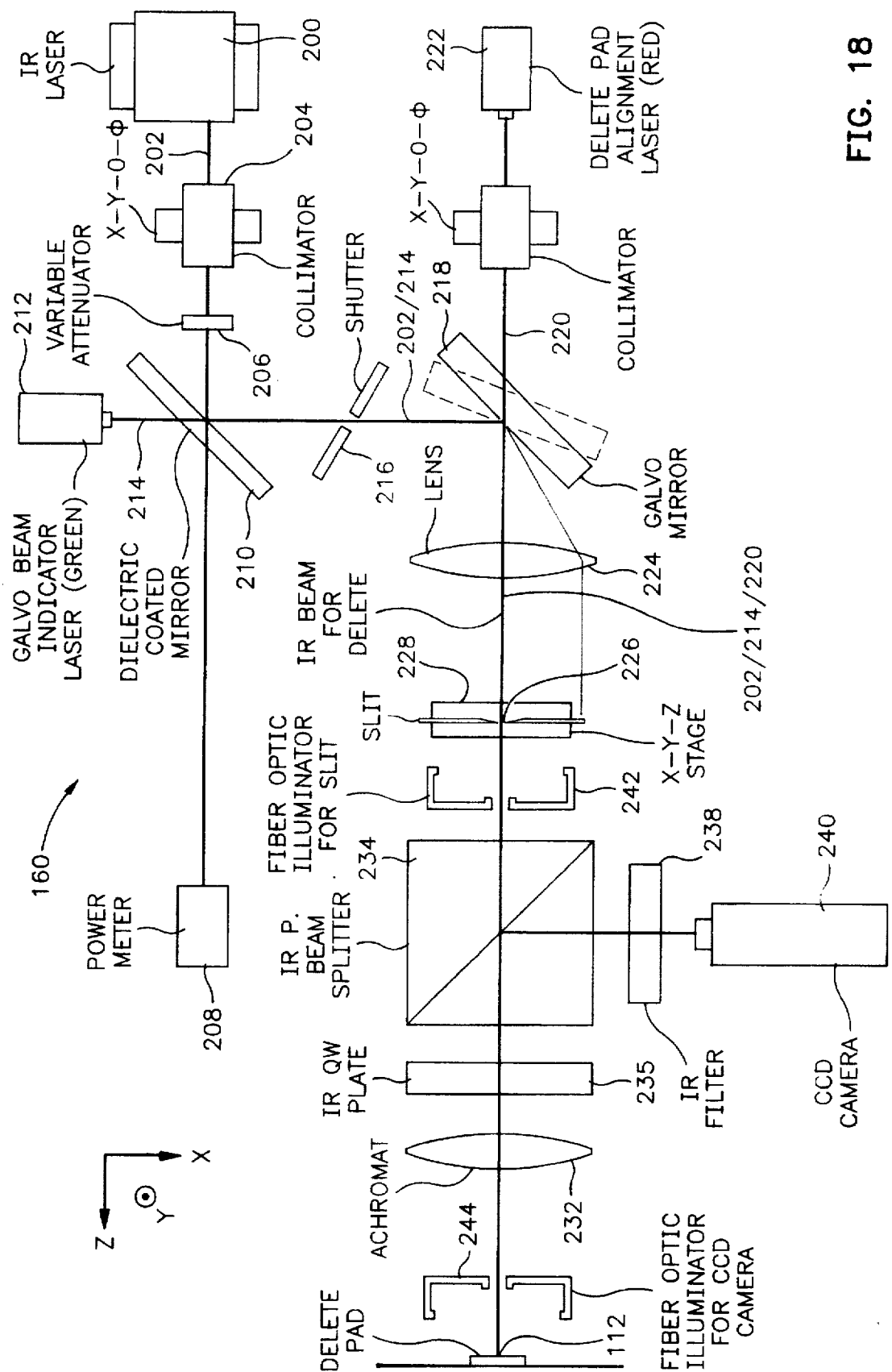
FIG. 18 is a schematic diagram of the laser apparatus.

A unique laser apparatus 160 for implementing the invention is illustrated in FIG. 18. An infra-red (IR) Nd:YLF acousto-optically Q-switched laser 200 is preferred because of its compactness, minimal maintenance requirements, and high pulse rate. The high pulse rate is very important as it dictates the fineness of the cut and also throughput. The laser beam 202 has an inherent divergence which is conditioned with a collimator 204 to produce an expanded and collimated beam. The expansion is required to reduce the diameter of the ultimately focused beam and therefore the width of the cut and facilitates a reasonable optical working distance. While beam expansion does not have to be integral with the collimator 204 it is preferred. A variable attenuator 206 is also placed in the output beam for adjustment of the pulse energy as determined by a power meter 208. The laser beam is then reflected by a mirror 210.

Because the IR laser beam is invisible, a laser 212 with visible laser beam 214, such as green, is placed behind the mirror 208 to provide an indicator beam for the IR laser beam 202. The mirror 210, which is dielectrically coated to reflect the IR beam from the laser 200, allows transmission of the green laser beam 214. The two beams 202 and 214 are configured to be collinear upon leaving the mirror 210.

The two laser beams then pass through an electromechanical shutter 216. The opening and closing of the shutter 216 is metered to control the cutting time. It also serves as a laser safety device. The two beams 202 and 214 are reflected by a Galvo mirror 218 which can rotate about an axis parallel to its surface and normal to the beams to trace a path on the delete pad 112. The mirror 218 is also dielectrically coated to reflect the beams 202 and 214 and allows transmission of a red alignment laser beam 220 from a laser 222. The beams 202, 214 and 220 are then focused by a lens 224 onto a slit 226 in a plate 228. The separation between the Galvo mirror 218 and the lens 224 is chosen to provide telecentric focusing such that any off axis ray originating from the Galvo mirror is refracted parallel to the axis of the lens. The slit 226 is also placed in the focal plane of the lens 224. When the laser is not cutting metal, the shutter 216 is closed. Further, the Galvo mirror 218 is in a parked position (phantom lines) such that the IR beam is reflected away from the axis of the lens so as to be blocked by the plate 228.

Both the IR beam 202 and green beam are not visible while the Galvo 218 is in park. In order to help identify consistent optical alignment, the laser 222 is employed. The laser 222 is chosen to be different in wavelength from the Galvo beam indicator laser 212, such as red, and is aligned in such a way that it always goes through the center of the slit 226. It is positioned so that its beam passes through the Galvo mirror 218. The rotation of the Galvo mirror therefore does not produce appreciable displacement of the focused alignment laser beam 220 on the delete pad 112. This alignment laser beam is also configured such that at the instant when the IR beam 202 and the green beam 214 pass through the center of the slit 226, the three laser beams are collinear. The red laser beam 220 is useful in two respects. First, it defines the center of the cutting path. Hence the red laser beam must always be at the center of the delete pad 112 when the Galvo beam is in park. Second, with the addition of its own collimator 230, the red laser beam 220 can be adjusted such that its focus after passing through an achromatic lens 232 coincides with that of the IR beam 202. In this respect, it helps in the identification of the focusing of the delete pad during operation. During cutting, the shutter 216 opens and the Galvo mirror 218 rotates the IR beam away from the parked position (phantom) to traverse across the longitudinal axis of the slit 226 which will be explained in more detail hereinafter. After the beam passes through the slit 226, it passes through an IR polarizing beam splitter 234 and a quarter wave plate 235 which are inserted for visualization purposes. The beam is ultimately focused with the achromatic lens 234 onto the delete pad 112 to produce the cutting stroke. The width of the slit 226 is adjusted to match the length of the cutting path. When cutting is complete, the shutter 216 closes and the IR beam 202 is returned to the park position by the Galvo mirror 218. The action of the shutter 216 complements that of the slit 226 to provide precision in cutting length.

A vision system is also employed. This is implemented by the combination of the beam splitter 234, quarter wave plate 235, IR filter 238, CCD camera 240 and fiber optic illuminators 242 and 244 for the slit 226 and for the camera 240.

The part of the IR radiation reflected from the delete pad 112 passes through the quarter wave plate 235 twice such that its polarization is rotated and reaches the camera 240 without interference with the original IR beam 202. The IR filter 238 limits the wavelength range of radiation reaching the camera and improves imaging quality by reducing glare caused by intense IR light at the camera.

In operation, the delete pad 112 is brought to the focus of the achromatic lens 234 by the use of a focusing system (not shown) and is held stationary. At this point, the red laser beam 220 should be at the center of the delete pad 112 while the IR beam 202 and green beam 214 are blocked by the shutter 216. When the cutting cycle begins, the Galvo mirror 218 rotates from its park position (phantom). At the correct instant, the shutter 216 opens and allows the IR beam 202 and the green beam 212 to pass through the slit 226. At this point, all three laser beams are focused by the achromatic lens 234 onto the delete pad 112. The IR beam 202 then initiates metal cutting. The green beam 214 simultaneously follows the cutting path traversed by the IR beam by the motion of the Galvo mirror 218. The green beam 214 therefore identifies the movement of the IR beam 202. At all times during cutting the red beam 220 remains centered on the delete pad 112. As the Galvo mirror 218 reaches the end of its rotation and reverses its direction of motion, the IR beam 202 can cut a second time if the shutter 216 remains open. The motion of the Galvo mirror 218 can be repeated as many times as desired to satisfy the cutting requirements. When cutting concludes, the shutter 216 closes and the Galvo mirror 218 returns to the park position (phantom). Another delete pad can then be brought to focus.

Figure 19:
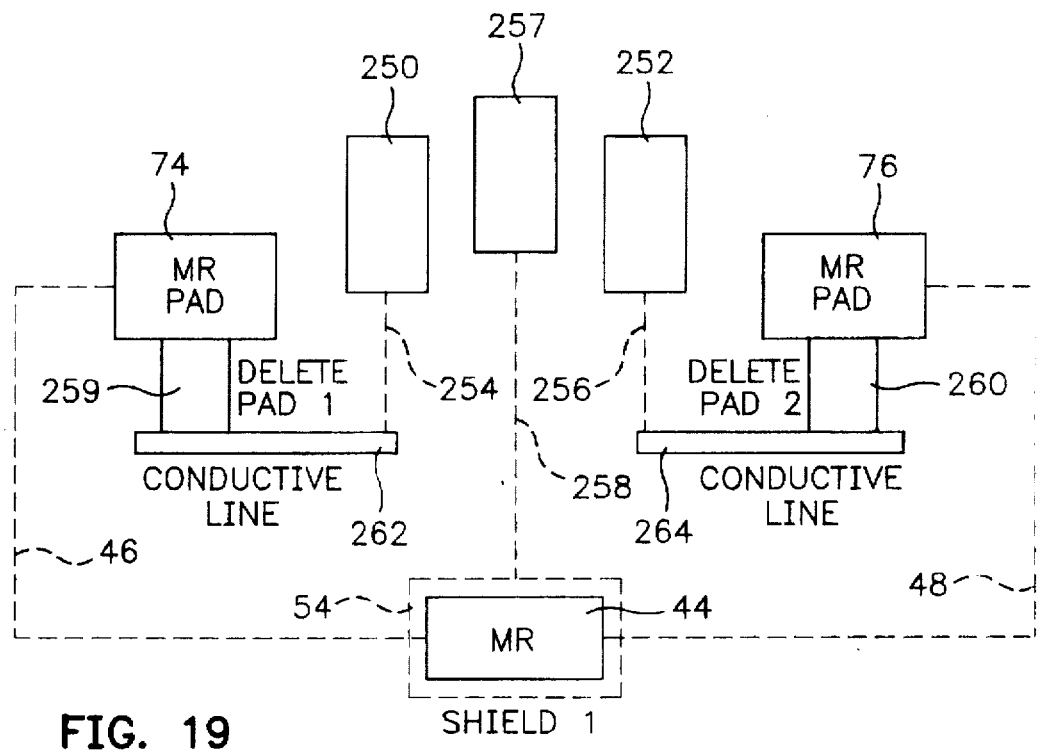
FIG. 19 is a diagrammatic illustration of another embodiment of an MR which employs a pair of delete pads.
Figure 20:
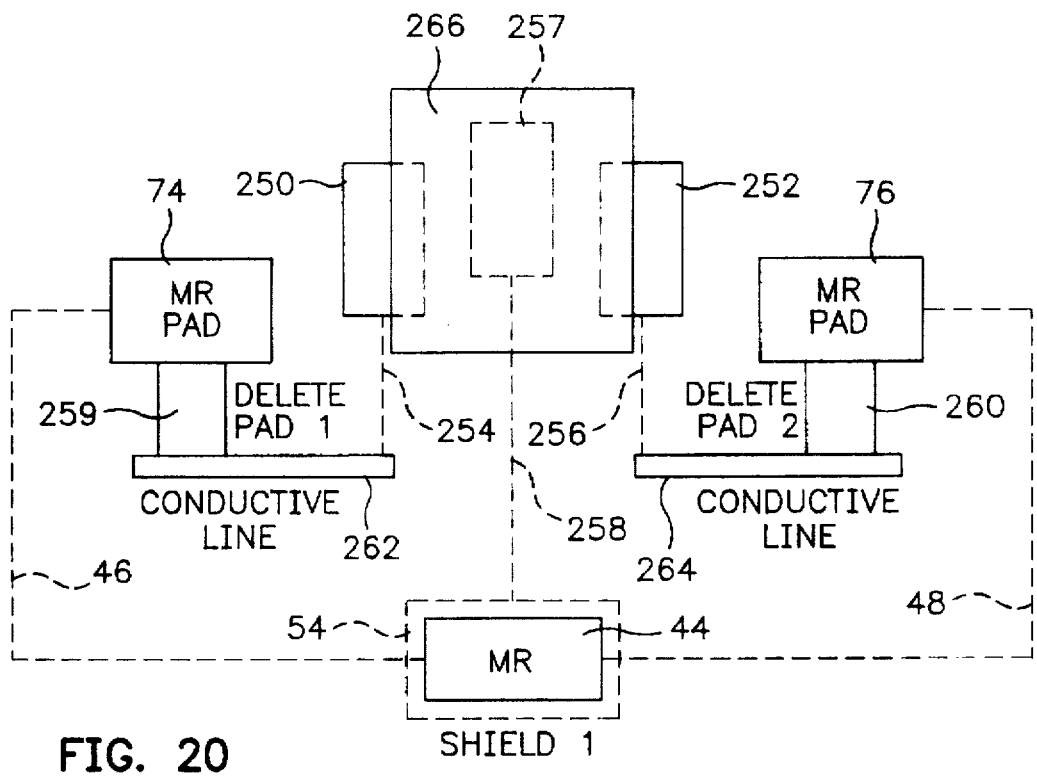
FIG. 20 is the same as FIG. 19 except the MR circuit has been shorted.
Figure 21:
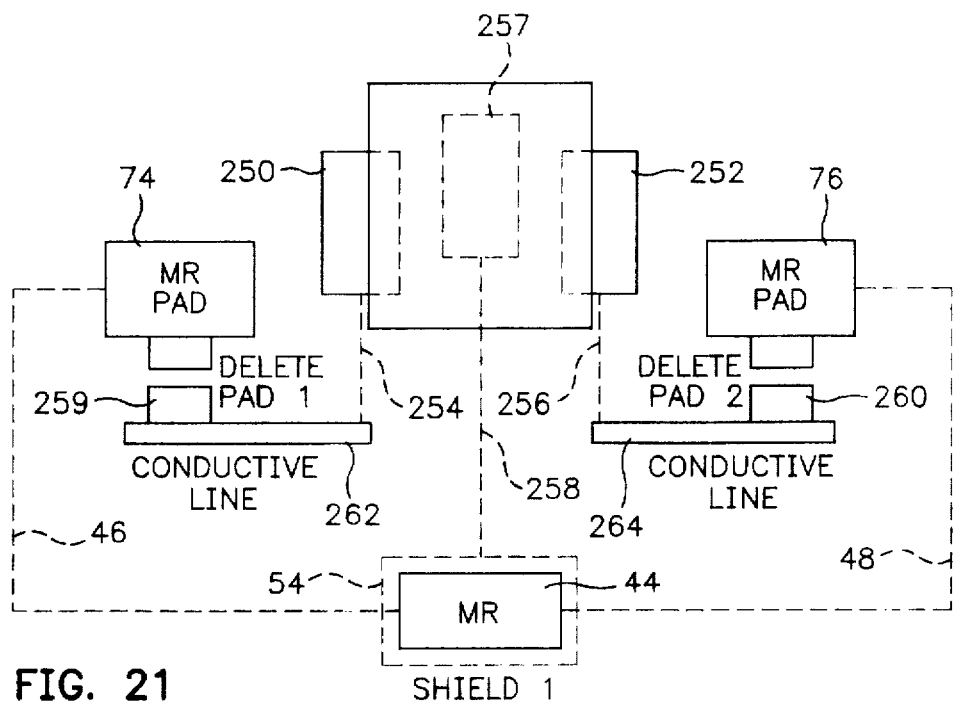
FIG. 21 is the same as FIG. 20 except the MR circuit has been opened by severing the circuit at both delete pads.
Figure 22:
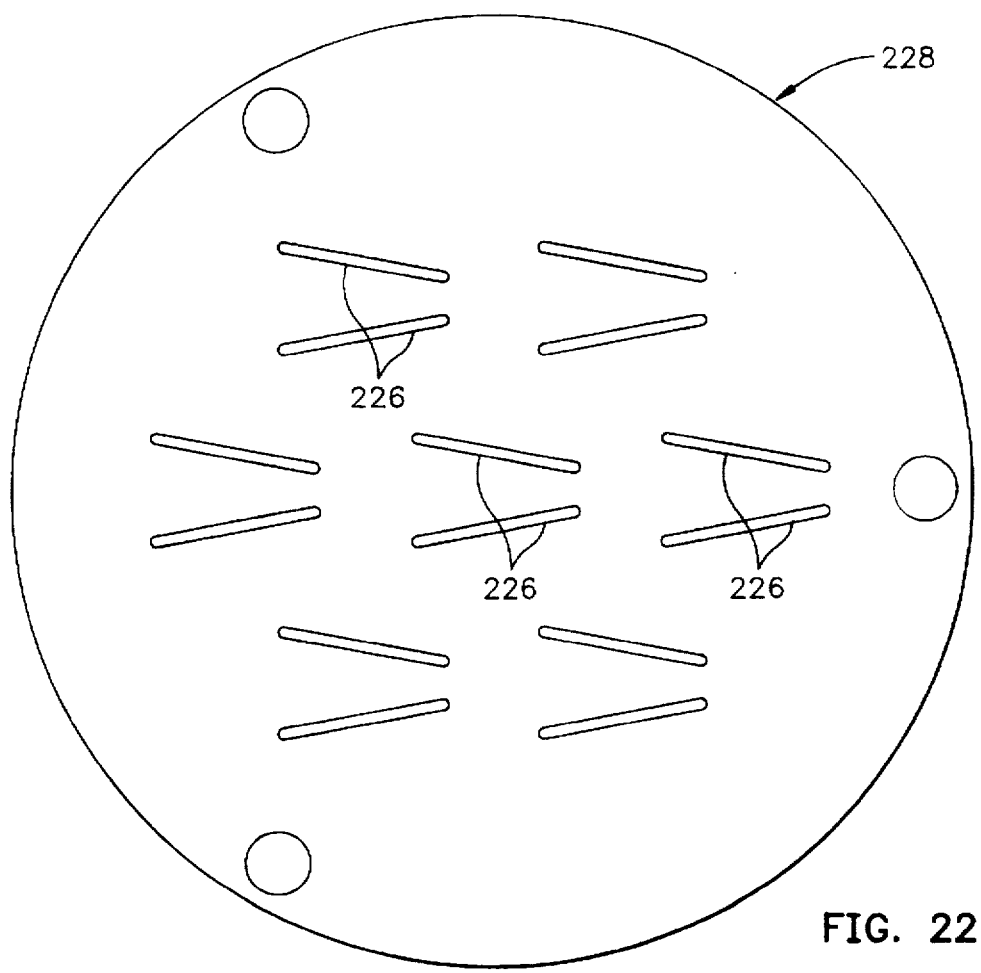
FIG. 22 is a mask which is employed in the laser apparatus for protecting all portions of the magnetic head except the delete pads which are to be severed.

In some instances it may be desirable to provide a pair of delete pads 212 which are severed one after the other by a single traversal of the beam of laser pulses thereacross. An arrangement for accomplishing this objective is shown in FIGS. 19–22. FIG. 19 is a schematic illustration of a single head surface at the wafer level, as shown in FIG. 2, FIG. 20 is a schematic illustration of the head surface at the row level, as shown in FIG. 4, and FIG. 21 is a schematic illustration of the head surface after severing the delete pads 212 at the head stack assembly level as shown in FIG. 10. In FIGS. 19, 20 and 21 the hidden lines are below the surface of the head and the full lines are components at or above the surface of the head. As seen in FIG. 19 the MR pads 74 and 76 are connected to the MR sensor 44 by first and second leads 46 and 48. Secondary MR pads 250 and 252 have leads 254 and 256 respectively, the outside ends of these leads connecting a via (not shown) to the head surface. A shield pad 257 has a lead 258 which is connected to the first shield 54. Before completion at the wafer level delete pads 259 and 260 are formed adjacent and in contact with each MR pad 74 and 76. Each delete pad may be 60 μm by 60 μm and 3700 Å thick. Connected between each delete pad and the vias (not shown) at the ends of the lines 254 and 256 are conductive lines 262 and 264. Each conductive line may be on the order of 2 μm thick. At the wafer level the MR sensor 44 is still an open circuit. At the row level a conductive patch 266 is formed across the pads 250, 252 and 257 for the purpose of closing the MR circuit and shorting the MR sensor 44 to the first shield 54 as shown in FIG. 20. Any ESD across the pads 74 and 76 will result in a shorting of the discharge to the first shield 54 which is much larger structure than the MR stripe of the MR sensor 44. In this manner the MR sensor is protected at the row level as shown in FIG. 4 until it is time for merge which is shown in FIG. 10. Before merge the delete pads 259 and 260 are severed as shown in FIG. 20. A single traversal of the beam of laser pulses can be employed for severing both delete pads in one stroke. This may be accomplished with the slit plate 228 in FIG. 22 which has a plurality of sets of slits 226, each pair of slits in each set diverging from one another. With this arrangement the slit plate 228 in FIG. 18 can be moved laterally until the two slits in a set are aligned with the pair of delete pads. The beam of laser pulses is then traversed generally across the pair of slits severing both delete pads while the solid plate portions between and around the slits masks and protects all other areas from the traversing laser beam.

Figure 23:
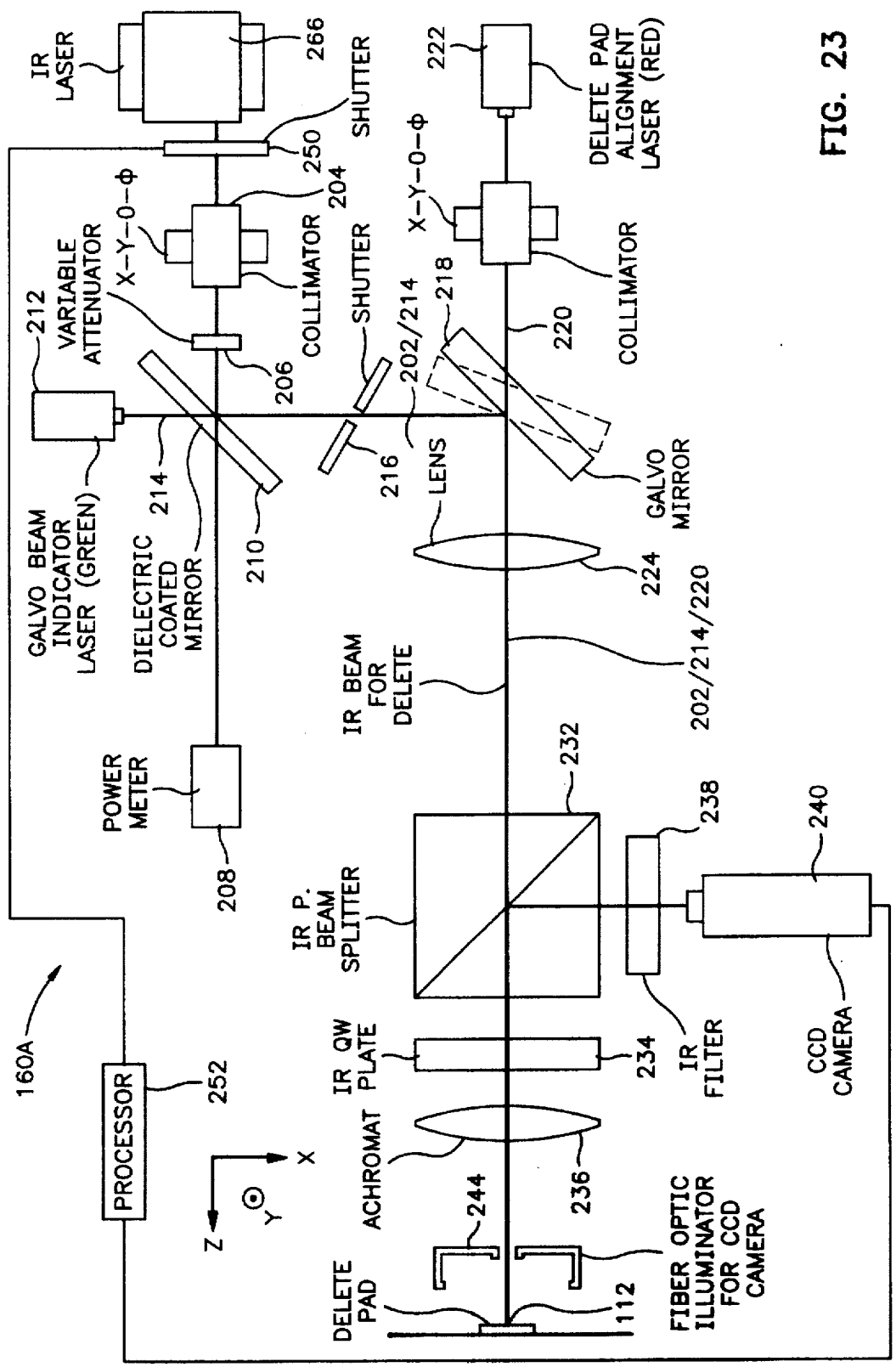
FIG. 23 is a schematic diagram of a modified laser apparatus.

In FIG. 23 a modified laser apparatus 160a is illustrated which is the same as the laser apparatus 160 in FIG. 17 except the plate 228 with the slit 226 has been omitted and components have been substituted therefor. One of these components is a shutter 250 which is located between the IR laser 200 and the mirror 210 for passing the IR beam only when the Galvo mirror 218 is traversing a delete pad. At all other times the shutter 250 is closed preventing the IR laser beam from damaging any structure of the magnetic head adjacent to the conductive line. Control of the shutter 250 may be implemented by a processor 252 which is responsive to the camera 240. Because of the reflection from the magnetic head the camera 240 gains intelligence as to where the conductive line is located as well as its delete pad. This information is fed to the processor 252 which provides signals to the shutter 250 which essentially masks the magnetic head from cutting action of the IR beam as it cuts across the delete pad.

Obviously, other embodiments and modifications of the invention will occur to those of ordinary skill in the art in view of the above teachings. Therefore, the invention is to be limited only by the following claims which include all such embodiments and modifications when viewed in conjunction with the above specification and the accompanying drawing.

We claim:

1. A method of protecting an MR sensor of a thin film MR head during manufacturing, the MR head having first and second exposed pads at a head surface which are connected to first and second leads from the MR sensor, the method comprising the steps of:

connecting a conductive line between the first and second pads, the line having a length between the pads, a width and a thickness; to form a delete pad, the thickness of the delete pad being in the range of 500 to 50,000 Å;

providing a predetermined reduced thickness length portion across the width of the line; and traversing a series of overlapping laser pulses across the delete paid with a fluence sufficient to cut the line by melting and surface tension withdrawal of line material laterally from the cut, yet insufficient to damage or generate debris from head material underlying the conductive line, said series of laser pulses having a rate in the range of 0.1 to 500 kHz, the energy of each pulse being in the range of 1 to 1,000 μJ, and the pulse width being in the range of 0.1 to 500 ns, which is sufficient to avoid cumulative heating of said conductive line between consecutive laser pulses, wherein each laser pulse melts conductive material across the thin film conductive line sufficiently to cause surface tension withdrawal of melted conductive material to adjacent cooler material of the thin film conductive line.

2. A method as claimed in claim 1, including the step of:

constructing the conductive line from a thin film layer of NiFe.

3. A method as claimed in claim 2, including the steps of:

employing a laser apparatus, the laser apparatus including a laser for producing a beam of said laser pulses and a first mirror for reflecting said beam;

focusing the beam on the first mirror; and the step of traversing comprising rotating the first mirror.

4. A method as claimed in claim 3, including the step of:

masking all areas outside the delete pad from said laser beam.

5. A method as claimed in claim 4, wherein:

each laser pulse having a spot size in the range of 1 to 100 μm; and the laser pulses traversing across the delete pad at a velocity in the range of 0.5 to 100 mm/sec.

6. A method as claimed in claim 5, wherein:

said delete pad having a length in the range of 10 to 200 μm and a width in the range of 10 to 200 μm.

7. A method as claimed in claim 6, wherein:

said head surface being constructed of alumina.

8. A method as claimed in claim 7, including the steps of:

placing a masking shutter between the laser and the first mirror for blocking and passing the beam from the laser;

controlling the masking shutter so that it passes the laser beam only when the laser beam traverses said delete pad; and the step of controlling comprising employing a camera for viewing the head surface, the conductive line and the delete pad.

9. A method as claimed in claim 8, including the steps of:

providing a second laser for producing a visible second laser beam;

employing a second mirror which can reflect the laser beam 90 degrees without reflecting the second laser beam from said second laser;

placing the lasers the second laser and the second mirror so that the laser beam is reflected 90 degrees to the first mirror and the second laser beam from the second laser is passed through to the first mirror;

employing a third laser for producing a third laser beam which is visible; and positioning the third laser so that the third laser beam is directed through the first mirror to the delete pad.

10. A method as claimed in claim 9, wherein:

the thickness of the delete pad being substantially 3,700 Å;

the energy of each pulse being substantially 8 μJ;

the pulse rate of the laser pulses being substantially 12.5 kHz;

the pulse width being substantially 12 ns;

each laser pulse having a spot size with a diameter of substantially 20 μm;

the laser pulses traversing across the delete pad at a velocity of substantially 8 mm/sec; and said delete pad having a length of substantially 60 μm and a width of substantially 60 μm.

11. A method of cutting a thin film conductive line formed on an underlying structure, comprising the steps of:

providing a laser apparatus for producing a sequence of short laser pulses at a high pulse rate, the laser apparatus including a laser for producing a laser beam including a sequence of laser pulses and a mirror for reflecting said beam;

focusing the beam on the mirror; and traversing comprising rotating the mirror;

positioning the thin film conductive line at a focal point of said sequence of laser pulses; and traversing the sequence laser pulses across the thin film conductive line;

each laser pulse having fluence sufficient to sever the thin film conductive line but insufficient to damage or generate debris from said underlying structure, wherein each laser pulse of the sequence of laser pulses melts conductive material across the thin film conductive line sufficiently to cause surface tension withdrawal of melted conductive material to adjacent cooler material of the thin film conductive line, wherein the thin film conductive line includes a delete pad, the thickness of the delete pad being in the range of 500 to 50,000 Å, the energy of each pulse being in the range of 1 to 1,000 μJ, the pulse rate of the laser pulses being in the range of 0.1 to 500 kHz, and the pulse width being in the range of 0.1 to 500 ns, said laser pulses being sufficient to allow cooling of material melted by a laser pulse and cooling of material below a sever in the thin film conductive line before a next laser pulse occurs.

12. A method as claimed in claim 11, wherein:

said laser pulses having a pulse rate and pulse width which are sufficient to avoid cumulative heating of said conductive line between consecutive laser pulses.

13. A method as claimed in claim 12, including the step of:

constructing the conductive line from a thin film layer of NiFe.

14. A method as claimed in claim 13, including the steps of:

placing a masking shutter between the laser and the mirror for blocking and passing the beam from the laser; and controlling the masking shutter so that it passes the laser beam only when the laser beam traverses said delete pad.

15. A method as claimed in claim 14, wherein:

the step of controlling comprising employing a camera for viewing the head surface, the conductive line and the delete pad.

16. A method of cutting a thin film conductive line formed on an underlying structure, comprising the steps of:

providing the thin film conductive line with a delete pad which has thickness in the range of 500 to 50,000 Å;

providing a laser apparatus for producing a substantially non-rectangular shaped laser beam including a sequence of short laser pulses at a high pulse rate;

positioning the delete pad of the thin film conductive line at a focal point of said sequence of laser pulses;

traversing the sequence laser pulses across the thin film conductive line at said delete pad;

each laser pulse having a fluence sufficient to melt conductive material across the thin film conductive line sufficiently to cause surface tension withdrawal of melted conductive material to adjacent cooler material of the thin film conductive line and sever the thin film conductive line, but insufficient fluence to damage or generate debris from said underlying structure;

said laser pulses having a pulse rate and pulse width sufficient to allow material melted by a laser pulse and material below a sever in the thin film conductive line to cool before a next laser pulse occurs;

the energy of each pulse being in the range of 1 to 1,000 μJ;

the pulse rate of the laser pulses being in the range of 0.1 to 500 kHz; and the pulse width being in the range of 0.1 to 500 ns.

17. A method as claimed in claim 16, wherein:

said laser pulses having a pulse rate and pulse width which are sufficient to avoid cumulative heating of said conductive line between consecutive laser pulses.

18. A method as claimed in claim 17, including the step of:

constructing the conductive line from a thin film layer of NiFe.

19. A method as claimed in claim 18, including the steps of:

employing a laser apparatus, the laser apparatus including a laser for producing a beam including said sequence of laser pulses and a mirror for reflecting said beam;

focusing the beam on the mirror; and the step of traversing comprising rotating the mirror.

20. A method as claimed in claim 19, including the steps of:

placing a masking shutter between the laser and the mirror for blocking and passing the beam from the laser; and controlling the masking shutter so that it passes the laser beam only when the laser beam traverses said delete pad.

21. A method as claimed in claim 20 wherein:

the step of controlling comprising employing a camera for viewing the head surface, the conductive line and the delete pad.

22. A method of protecting and terminating protection of an MR sensor of a thin film MR head during manufacturing, the MR head having first and second exposed pads at a head surface which are connected to first and second leads from the MR sensor, the method comprising the steps of:

connecting a conductive line between the first and second pads for protecting the MR sensor, the line having a length between the pads, a width and a thickness;

providing a predetermined reduced thickness length portion across the width of the line to form a delete pad;

employing a laser apparatus that has first, second and third lasers for producing first, second and third laser beams, the first beam being invisible and having a series of laser pulses for terminating protection of the MR sensor and the second and third laser beams being visible;

employing first and second mirrors, the second mirror directing the first and second laser beams on the first mirror and the first mirror being rotatable so as to traverse the first and second laser beams across the conductive line at said delete pad;

the third laser being positioned so that the third laser beam is directed through the first mirror to the delete pad even though the first mirror is rotated;

rotating the first mirror so as to traverse the first and second laser beams across the conductive line at said delete pad with a series of said laser pulses overlapping one another;

while rotating the first mirror, providing the laser pulses with a fluence sufficient to cut the delete pad and thereby sever the conductive line at the delete pad by melting and surface tension withdrawal of conductive line material laterally from the cut, yet insufficient fluence to damage or generate debris from head material underlaying the conductive line at the delete pad;

placing a masking shutter between the first and second mirrors for blocking and passing the first and second laser beams; and employing a camera for viewing the head surface, the conductive line and the delete pad for controlling the masking shutter so that it passes the first and second laser beams only when the first and second laser beams traverse the conductive line at the delete pad.

* * * * *

UNITED STATES PATENT AND TRADEMARK OFFICE
CERTIFICATE OF CORRECTION

PATENT NO. : 5,759,428
DATED : June 2, 1998
INVENTOR(S) : Balamane et al

It is certified that error appears in the above-identified patent and that said Letters Patent is hereby corrected as shown below:

Column 10, line 50, change "paid" to --pad--.

Column 11, line 37, change "lasers" to --laser,--.

Signed and Sealed this

Sixteenth Day of February, 1999

Attest:

Attesting Officer

Acting Commissioner of Patents and Trademarks